United States Patent
Tiecher

(10) Patent No.: US 12,338,893 B2
(45) Date of Patent: Jun. 24, 2025

(54) SYSTEM FOR SUPPORTING AND TENSIONING CHAINS, BELTS AND THE LIKE

(71) Applicant: Mauro Tiecher, Chapecó (BR)

(72) Inventor: Mauro Tiecher, Chapecó (BR)

( * ) Notice: Subject to any disclaimer, the term of this patent is extended or adjusted under 35 U.S.C. 154(b) by 216 days.

(21) Appl. No.: 18/249,607

(22) PCT Filed: Jan. 1, 2021

(86) PCT No.: PCT/BR2021/050002
§ 371 (c)(1),
(2) Date: Apr. 19, 2023

(87) PCT Pub. No.: WO2022/082281
PCT Pub. Date: Apr. 28, 2022

(65) Prior Publication Data
US 2023/0383818 A1    Nov. 30, 2023

(30) Foreign Application Priority Data
Oct. 19, 2020 (BR) .......... 10 2020 0213180

(51) Int. Cl.
*F16H 7/08* (2006.01)
*A22C 21/00* (2006.01)
(Continued)

(52) U.S. Cl.
CPC .............. *F16H 7/08* (2013.01); *B65G 19/02* (2013.01); *B65G 21/20* (2013.01); *B65G 23/44* (2013.01);
(Continued)

(58) Field of Classification Search
CPC ................. F16H 7/08; F16H 2007/081; F16H 2007/0842; F16H 2007/0872;
(Continued)

(56) References Cited

U.S. PATENT DOCUMENTS

| | | | | |
|---|---|---|---|---|
| 3,648,823 A | * | 3/1972 | Neer .................... | B65C 9/02 198/814 |
| 3,963,115 A | * | 6/1976 | Teske ................... | B65G 43/02 198/810.04 |
| (Continued) | | | | |
| 4,884,679 A | * | 12/1989 | Graef ................. | G07D 11/0096 109/55 |
| 5,895,332 A | * | 4/1999 | Olson .................. | B65G 23/44 198/813 |

FOREIGN PATENT DOCUMENTS

| | | |
|---|---|---|
| BR | 8704238 | 2/1989 |
| CN | 201341383 | 11/2009 |
| | (Continued) | |

OTHER PUBLICATIONS

International Search Report for PCT/BR2021/050002 dated Mar. 30, 2021.
Written Opinion for PCT/BR2021/050002 dated Mar. 30, 2021.

*Primary Examiner* — Mark A Deuble
(74) *Attorney, Agent, or Firm* — B. Aaron Schulman, Esq.; Stites & Harbison, PLLC

(57) ABSTRACT

The present invention relates to a system (S) for supporting and tensioning chains or other transmission and/or conveyance elements installed on a machine (M). The system (S) includes a guide device (D) for the gripper and conveyor chain (M1), in which the movement of the guide device (D) corresponds to the movement of the bearings (M2). The guide device (D) includes an element (D1) for supporting and protecting a longitudinal contact element (D2), in which the support and protection element (D1) is coupled to the bearings (M2), while the longitudinal contact element (D2) is used to guide and constantly pressurize an appropriate segment of the gripper and conveyor chain (M1). The system (S) also includes an automatic tensioning unit (C) provided with a pressure element (C1).

7 Claims, 4 Drawing Sheets

(51) Int. Cl.
  *B65G 19/02*    (2006.01)
  *B65G 21/20*    (2006.01)
  *B65G 23/44*    (2006.01)

(52) U.S. Cl.
  CPC .. *A22C 21/0053* (2013.01); *F16H 2007/0842* (2013.01); *F16H 2007/0872* (2013.01); *F16H 2007/0893* (2013.01); *F16H 2007/0897* (2013.01)

(58) Field of Classification Search
  CPC ..... F16H 2007/0893; F16H 2007/0897; F16H 7/06; F16H 7/00; B65G 23/44; B65G 19/02; B65G 21/20; A22C 21/0053
  See application file for complete search history.

(56) References Cited

U.S. PATENT DOCUMENTS

| | | | | |
|---|---|---|---|---|
| 6,042,726 | A * | 3/2000 | Anderson | B23Q 11/1069 210/406 |
| 6,189,682 | B1 * | 2/2001 | Hill | B27M 1/08 144/250.15 |
| 9,301,450 | B2 * | 4/2016 | Boyd | A01D 61/008 |
| 9,999,234 | B1 * | 6/2018 | Diab | A22C 21/0053 |

FOREIGN PATENT DOCUMENTS

| | | |
|---|---|---|
| CN | 101773275 | 7/2010 |
| CN | 201830824 | 5/2011 |
| CN | 103749637 | 4/2014 |
| CN | 210153162 | 3/2020 |

* cited by examiner

SYSTEM FOR SUPPORTING AND TENSIONING CHAINS, BELTS AND THE LIKE

BACKGROUND OF THE INVENTION

The present invention relates to a system for supporting and tensioning conveyor chains, conveyor belts and the like, particularly used to promote the supporting and tensioning of conveyor chains or conveyor belts automatically, in apparatuses that use movable bearings or shafts for their position adjustment. This system uses a tensioning and supporting device for a gripping and transporting conveyor chain, and/or an automatic tensioner assembly of at least one transmission element.

Mechanisms for adjusting the position and tensioning of conveyor chains, conveyor belts or other similar transmission elements, used in several specific applications, are well known for those of ordinary skill in this art.

These mechanisms were developed to facilitate the maintenance of apparatuses that use these geared components, which are moved from a motor component so that they do not operate slackened. Some examples of apparatuses that use these mechanisms are meat processing apparatuses, such as giblets of slaughtered birds, etc. Such apparatuses comprise several bearings wherein their positions must be adjusted for several reasons, such as maintenance and modification of configurations for different application needs.

These apparatuses, as well as others that also have bearings or shafts, and in which their positions need to be adjusted for various reasons, present an extra care for each apparatus to be ready to work, as their geared components, such as conveyor chains, conveyor belts or other transmission elements, need to be stretched and tensioned correctly to fulfill their respective functions. Moreover, depending on the apparatus configurations in which these components are installed in a same transmission ratio, from the same motor component, this need for adjustment occurs successively, generating a cascade effect.

Thus, in addition to the regular need to adjust the tensioning of geared components due to wear, changing the position of any bearing or shaft related to these geared components also generates the need to adjust their tensioning.

Disadvantageously, these adjustments in tensioning the conveyor chains, conveyor belts or similar, associated with bearings or shafts that need to be repositioned, occur individually and manually, and each tensioning adjustment must be performed only after all position adjustments have been completed of each bearing and/or shaft associated with the transmission system of the components that need to be stretched under tension.

Nevertheless, in cases of more specific applications, as in the case of the use of gripping and transporting conveyor chains, in which, in addition to being stretched and tensioned, also need to be pressed against the objects that will be gripped and transported by them, also need to adjust the positioning of a component that performs this pressure against the "back" of the chain, in a specific position, whenever any bearing or shaft related to the movement of this conveyor chain undergoes some position adjustment.

Disadvantageously, this repositioning of the pressing component also needs to be performed only after completing all the position adjustments of each bearing and/or shaft associated with the transmission system of this gripping and transporting conveyor chain.

In order to solve these inconveniences from the state of the art, the present invention proposes a system for supporting and tensioning conveyor chains, conveyor belts or similar, which acts automatically to properly stretch and support each geared component that is associated with the same transmission system of each bearing or shaft of which its position is changed.

Thus, it is an objective of the present invention to provide a system for supporting and tensioning conveyor chains, conveyor belts or similar, acting to adjust the tension of the conveyor chains, conveyor belts or similar simultaneously to the adjustment of the position of each bearing or shaft related to the system so that a human operator only needs to act on the adjustment of the bearings or shafts, while the system of the present invention acts automatically, without interference from a human operator.

It is also an objective of the present invention to provide a system for supporting and tensioning conveyor chains that, in addition of acting to tension the conveyor chain automatically, as the position of some bearing or shaft is adjusted, also acts to press a gripping and transporting conveyor chain, automatically, without interference from a human operator.

Advantageously, the present invention presents a system for supporting and tensioning conveyor chains, conveyor belts or similar with a simple and efficient design, resulting in productivity gains in the apparatus operation and maintenance preparations.

Schematic drawings of a particular embodiment of the invention can herein be seen. The dimensions and proportions presented in these schemes are not necessarily the real ones, as the drawings are only intended to didactically present its various aspects. The scope of protection is determined only by the scope of this document claims.

DESCRIPTION OF THE INVENTION

As represented by the accompanying drawings, the system S for supporting and tensioning conveyor chains, conveyor belts and similar transmission and/or transport elements is installed in a machine M, such as a giblet (not shown) processing apparatus of slaughtered birds (not shown), such as gizzards, hearts or others.

In the embodiment of a configuration of the invention illustrated by the attached figures, the machine M is configured by a giblet cleaning apparatus (not shown). However, it will be understood that said machine M may be configured for different apparatus models, without deviating from the scope of protection of the attached claims.

As illustrated by FIGS. 1 to 5, the system S is installed in a machine M, equipped with bearing assemblies M2 with peripheral gears M3 that move a gripping and transporting conveyor chain M1. This gripping and transporting conveyor chain M1 needs to be always stretched and pressed down to fulfill its function more efficiently, even when one or more of the bearing assemblies M2 are displaced, usually for adjusting the position of their respective peripheral gears M3.

To solve this need, said system S comprises a guiding device D of the gripping and transporting conveyor chain M1, with the displacement of the guiding device D corresponding to the displacement of the bearing assemblies M2, in a manner it occurs automatically, along with the displacement of each bearing assembly M2. In an embodiment of the invention, said guiding device D has the configuration of a tandem, being fixed in two bearing assemblies M2.

Said guiding device D comprises a supporting and protecting element D1 of a longitudinal contact element D2. The supporting and protecting element D1 is coupled to the bearing assemblies M2, while the longitudinal contact element D2 is responsible for constantly guiding and pressing a convenient segment of the gripping and transporting conveyor chain M1.

Moreover, the supporting and protecting element D1 comprises a support segment D10 equipped with coupling edges D11 in the bearing assemblies M2. Thus, the support segment D10 is responsible for supporting the longitudinal contact element D2, conditioning its vertical displacement to the vertical displacement of the bearing assemblies M2.

Figure 1:
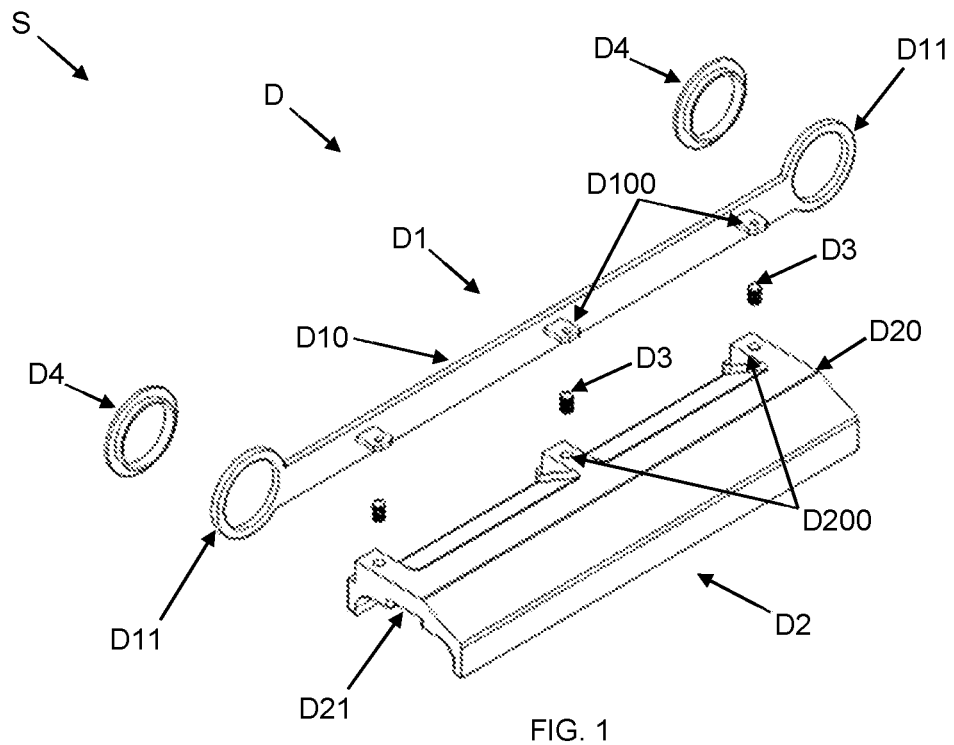
FIG. 1 illustrates an exploded perspective view of the system S, emphasizing the guiding device D.
Figure 2:
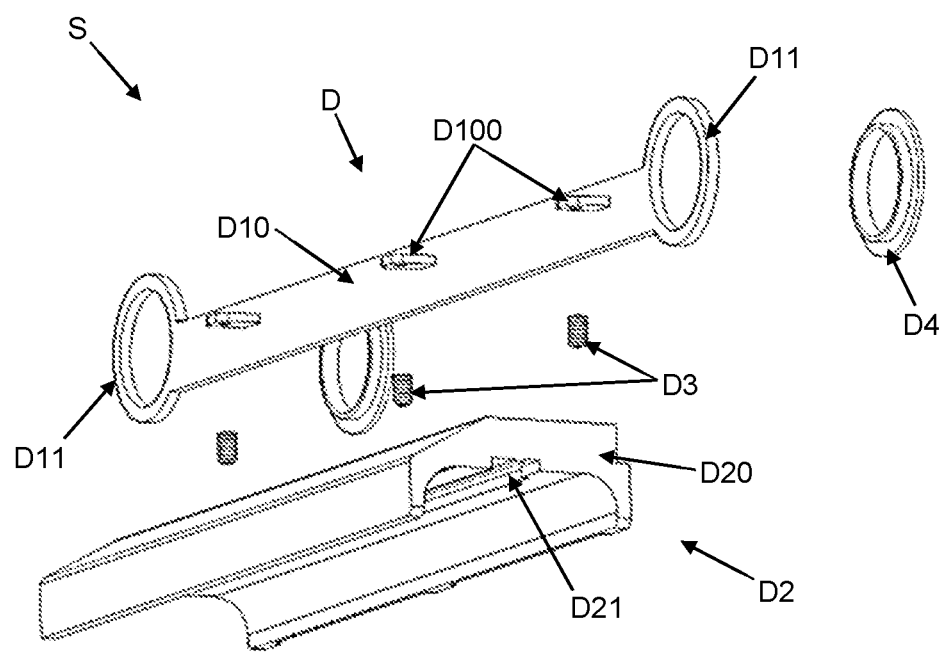
FIG. 2 illustrates an exploded lower perspective view of the system S, emphasizing the guiding device D.
Figure 3:
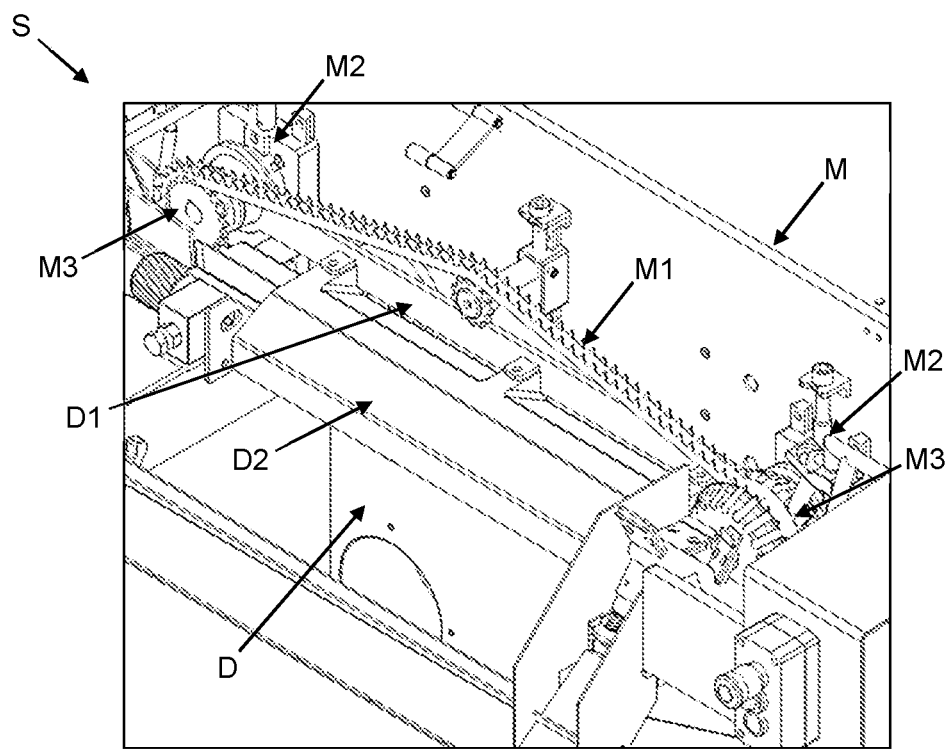
FIG. 3 illustrates a schematic partial perspective view of an application embodiment of the system S, emphasizing the installation of the guiding device D in a machine M.
Figure 4:
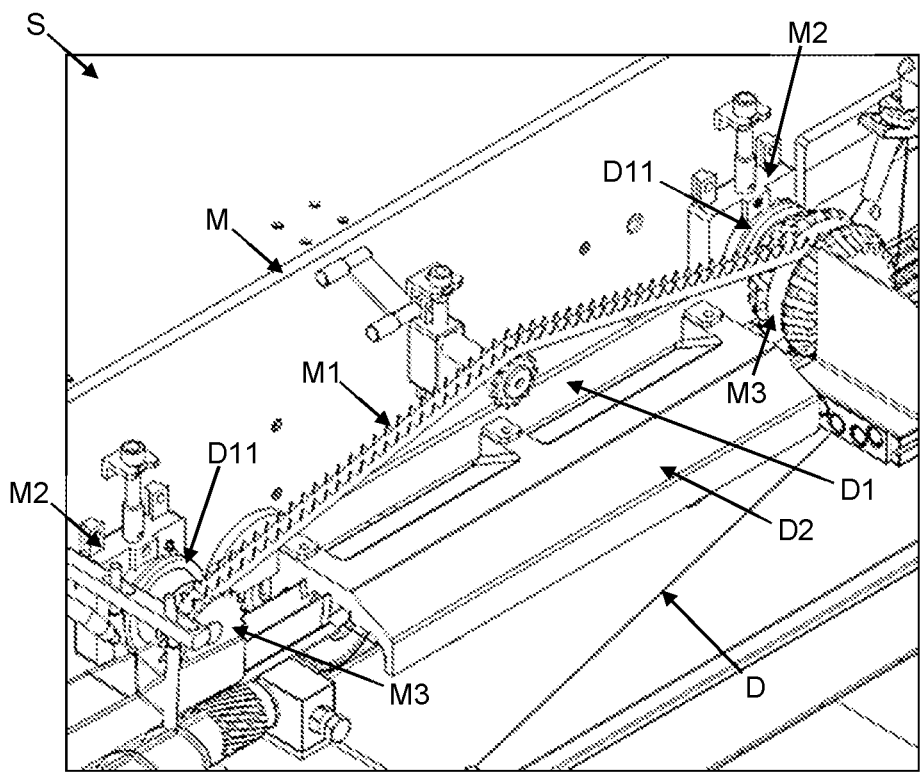
FIG. 4 illustrates a schematic partial perspective view of an application embodiment of the system S, emphasizing the installation of the guiding device D in a machine M.
Figure 5:
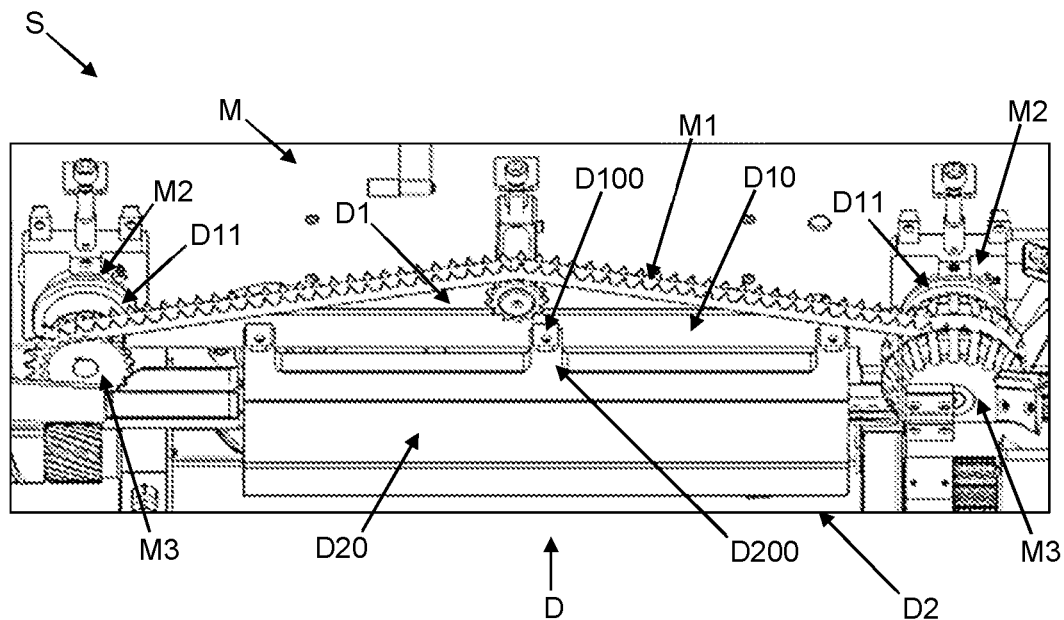
FIG. 5 illustrates a schematic partial perspective view of an application embodiment of the system S, emphasizing the installation of the guiding device D in a machine M.

Preferably, as illustrated by FIG. 1, each coupling edge D11 is configured by a ring with a shape and dimensions corresponding to the shape and dimensions of an annular segment of each bearing assembly M2, in order to contour it and promote easy installation. However, it will be understood that each coupling edge D11 can be configured in different shapes and dimensions, also having other components to help its fixation with each bearing assembly M2 model.

Also, preferably, the guiding device D comprises protecting members D4 for fitting of the coupling edges D11 in the beating assemblies M2, in order to avoid direct contact between each coupling edge D11 with a bearing assembly M2, in embodiments in which this contact causes wear of some of the components, due to their composition materials.

The longitudinal contact element D2 comprises a contact body D20, which is preferably provided with a continuous lower duct D21 for laying the gripping and transporting conveyor chain M1. Said continuous lower duct D21 extends under the entire contact body D20, and it is conveniently shaped to form a track where a segment of the gripping and transporting conveyor chain M1 constantly passes by, keeping it stretched, guided and pressed down.

In addition, preferably, the contact body D20 comprises lower connection regions D200 arranged in positions corresponding to the positions of upper connection regions D100 of the support segment D10, enabling the fixation of these regions (D100 and D200) with each other, in order to facilitate the fixation of the longitudinal contact element D2 in the supporting and protecting element D1.

Thus, each upper connection region D100 can be fastened with a lower connection region D200, in an easy way, by means of a fastening element D3.

Alternatively, the supporting and protecting element D1 and the longitudinal contact element D2 can form a single piece, without the need of using fastening elements D3.

Figure 6:
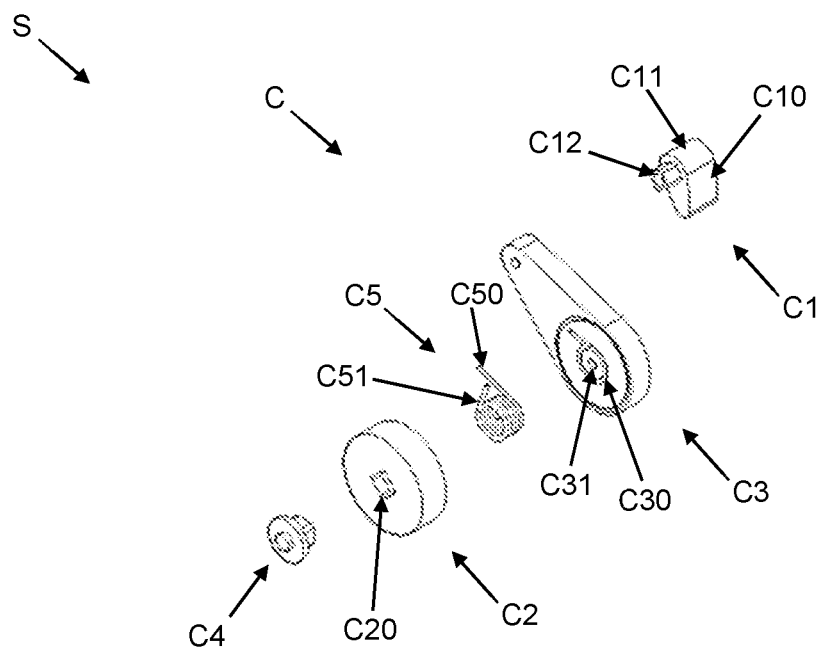
FIG. 6 illustrates an exploded perspective view of the system S, emphasizing the automatic tensioner assembly C.
Figure 7:
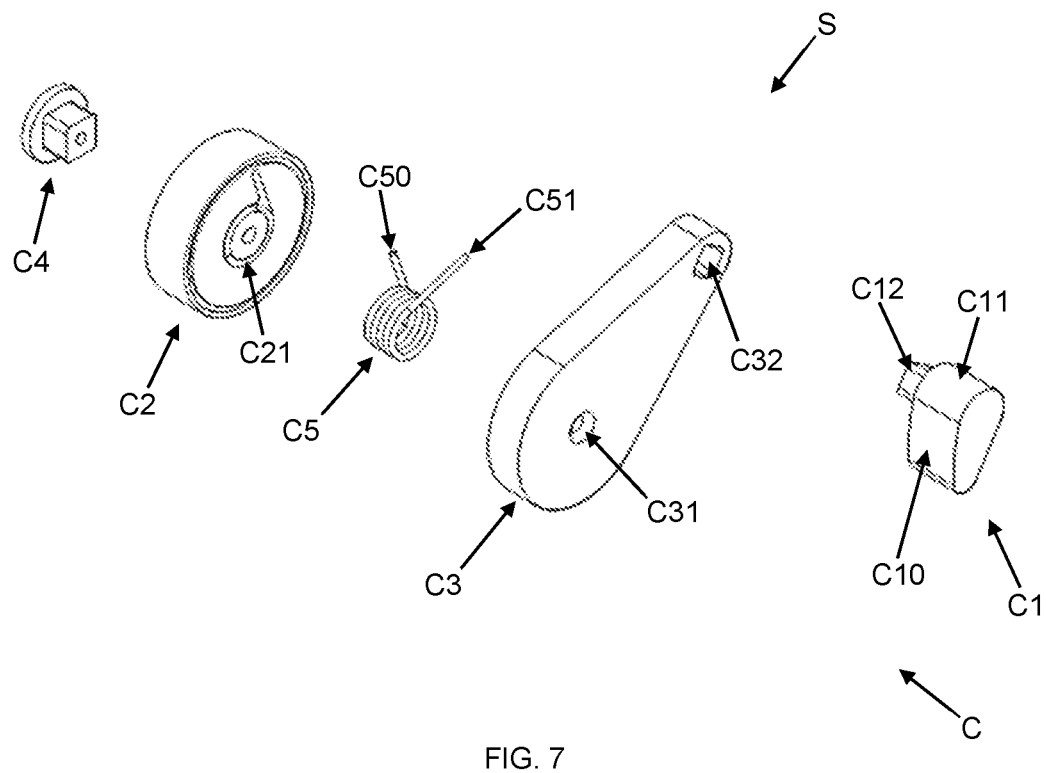
FIG. 7 illustrates an exploded rear perspective view of the system S, emphasizing the automatic tensioner assembly C.
Figure 8:
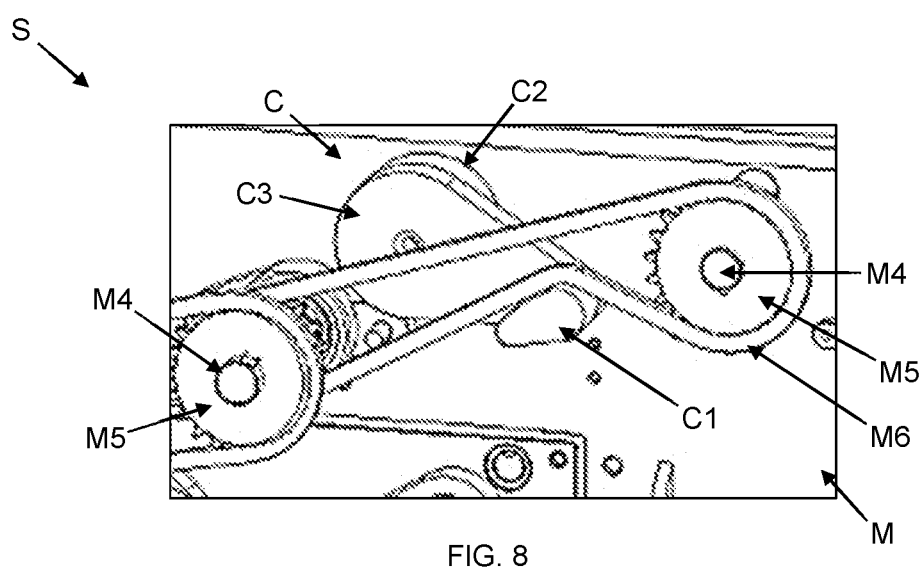
FIG. 8 illustrates a schematic partial perspective view of an application embodiment of the system S, emphasizing the installation of the automatic tensioner assembly C in a machine M.

As illustrated by FIGS. 6 to 8, the system S is installed on a machine M provided with shafts M4 of gears M5, which are interconnected with each other by at least one transmission element M6, such as a conveyor chain. At least one of the shafts M4 can be displaced for position adjustment, usually of some other machine M component, so that the displacement of any one of the shafts M4 causes changes in the position of the transmission element M6.

Thus, to maintain the tension of each transmission element M6, the system S comprises an automatic tensioner assembly C equipped with a pressing element C1, which is responsible for the constant contact and pressure of at least one transmission element M6, and its positioning is variable as each shaft M4 is shifted.

Thus, any vertical displacement of any of the shafts M4 will result in the automatic repositioning of the pressing element C1, in order to maintain the constant tension of each transmission element M6. Usually, only one transmission element M6 is in contact with the pressing element C1. However, depending on the application of this invention, the pressing element C1 may be dimensioned to be in contact with more than one transmission element M6 simultaneously.

Therefore, the automatic tensioner assembly C comprises a static base C2 for its fixation to the machine M and for coupling a mobile base C3 to support the pressing element C1. Thus, the static base C2 is conveniently installed in the machine M in order to work as a support for the mobile base C3, which has its movement conditioned to the movement of each transmission element M6 that is in contact with the pressing element C1.

Furthermore, the mobile base C3 exerts a convenient force so that its movement occurs in the right measure as each shaft M4 is displaced, resulting in a constant tensioning of each transmission element M6.

Preferably, the automatic tensioner assembly C comprises an elastic element C5 for controlled movement of the mobile base C3 relative to the static base C2. Thus, the elastic element C5 is dimensioned to exert the appropriate force so that the movement of the mobile base C3 occurs in the right measure, as each shaft M4 is displaced.

In a preferred configuration embodiment of this invention, the static base C2 comprises a first niche C21 for installing a first coupling segment C50 of the elastic element C5, while the mobile base C3 comprises a second niche C30 for installing a second coupling segment C51 of the elastic element C5 for constantly pressing the mobile base C3 in a rotation direction around a turning point C31 of the mobile base C3 on the static base C2.

Therefore, the elastic element C5 can be easily coupled between the static base C2 and the mobile base C3, forming a spring that controls the rotation of the mobile base C3 as the pressing element C1 receives a force of greater or lesser intensity from its contact with each transmission element M6.

Also preferably, to allow convenient support of each transmission element M6, the pressing element C1 has a cam shape, and is provided with a linear contact surface C10 followed by a contour surface C11, which determines the pressure point of each transmission element M6.

In a configuration embodiment of the present invention, the pressing element C1 comprises a static fitting element C12 that fits into a first fitting opening C32 of the mobile base C3, facilitating the fitting of the pressing element C1 in the mobile base C3 and ensuring that it does not move without the moving of the mobile base C3.

Also, in a configuration embodiment of the present invention, to facilitate its installation in the machine M, the automatic tensioner assembly C comprises a static fastening element C4 for fitting into a second fitting opening C20 of the static base C2 in the machine M.

Preferably, the static fitting element C12 comprises a regular polygonal shape compatible with the shape of the first fitting opening C32. Similarly, the static fastening element C4 comprises a regular polygonal shape compatible with the shape of the second fitting opening C20.

Thus, the position adjustment of the pressing element C1 is facilitated, as both the static base C2 and the pressing element C1 itself can be coupled in different positions, since the regular polygon formats, with identical edge lengths of the static fitting element C12 and the static fastening element C4 allow coupling to be made in different positions.

Finally, in an embodiment of a preferred application of the present invention, the guiding device D and the automatic tensioner assembly C are installed in the same machine M, in a manner that the displacement of any bearing assembly M2 that houses a shaft M4, results in position adjustments, in a convenient and automatic way, of both the guiding device D and the automatic tensioner assembly C, simultaneously.

The person skilled in the art will readily notice from the description various ways of performing the invention without departing from the scope of the enclosed claims.

What is claimed is:

1. A system for supporting and tensioning conveyor chains, the system being installed in a machine provided with bearing assemblies of peripheral gears that move a gripping and transporting conveyor chain, the system further comprising:
   a guiding device of the gripping and transporting conveyor chain, wherein displacement of the guiding device corresponds to displacement of the bearing assemblies.

2. The system according to claim 1, wherein the guiding device comprises:
   a supporting and protecting element of a longitudinal contact element, wherein the supporting and protecting element is coupled to the bearing assemblies.

3. The system according to claim 2, wherein the supporting and protecting element comprises:
   a support segment provided with coupling edges in the bearing assemblies.

4. The system according to claim 2, wherein the longitudinal contact element comprises:
   a contact body provided with a continuous lower duct for laying the gripping and transporting conveyor chain.

5. The system according to claim 2, wherein the longitudinal contact element comprises a contact body and the supporting and protecting element comprises a support segment, and wherein lower connections regions of the contact body connect with upper connection regions of the support segment.

6. The system according to claim 5, wherein each of the upper connection regions is fastened with one of the lower connection regions by means of a fastening element.

7. The system according to claim 3, wherein the guiding device further comprises:
   protecting members for fitting of the coupling edges in the bearing assemblies.

* * * * *